April 28, 1953 N. N. SOLOVIOFF 2,636,316
FISHING LURE
Filed May 2, 1950
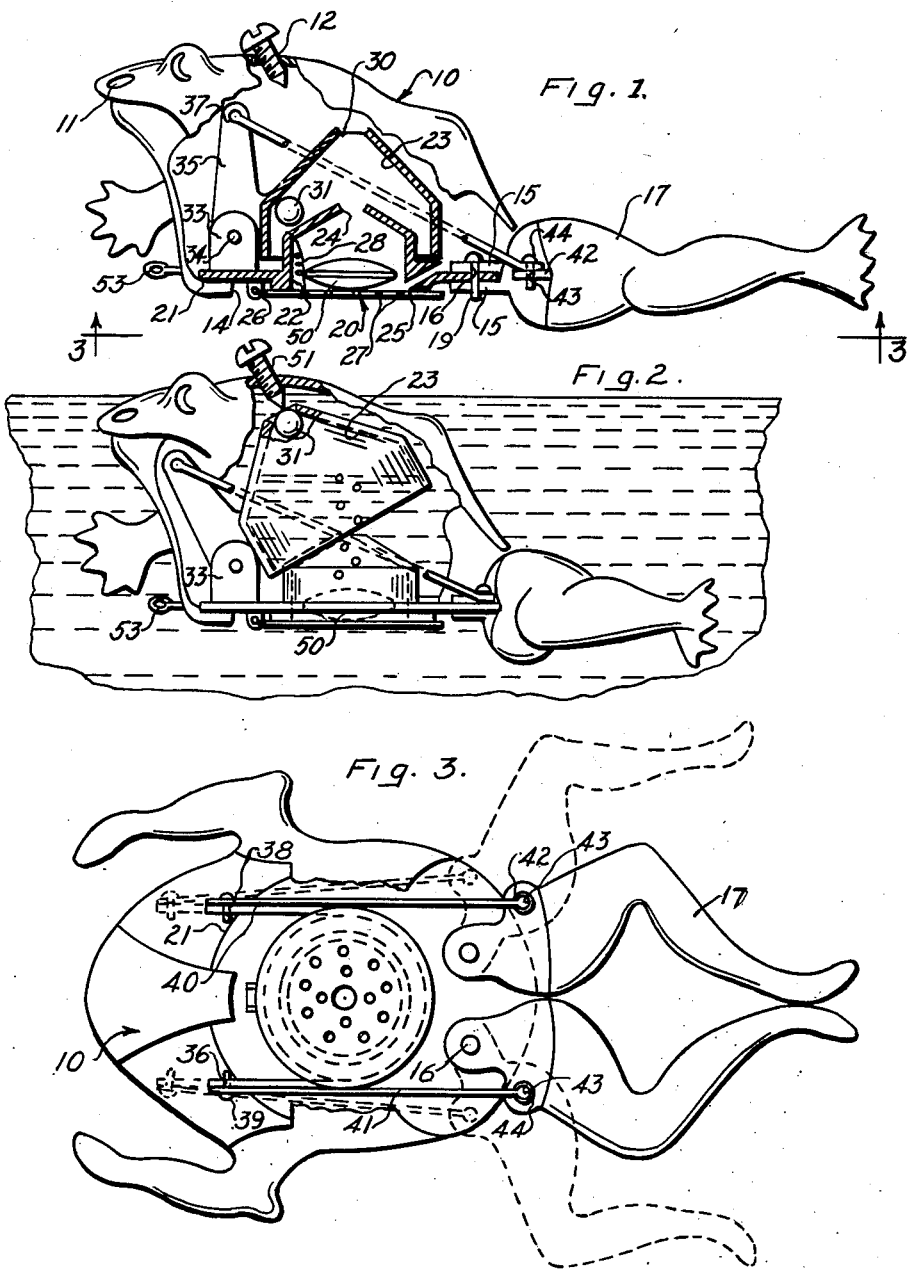
INVENTOR.
NICHOLAS N. SOLOVIOFF
BY
Howard T. Jeandron
ATTORNEY Patented Apr. 28, 1953

2,636,316

UNITED STATES PATENT OFFICE 2,636,316

FISHING LURE

Nicholas N. Solovioff, Great Neck, N. Y.

Application May 2, 1950, Serial No. 159,570

8 Claims. (Cl. 46—92)

This invention relates to lures for fishing and more particularly to an artificial bait which is constructed to resemble a frog.

In this invention the frog is constructed with a hollow body. In the hollow body of the frog a gas chamber and pivotally operated valve are provided. The pivotally operated valve is in turn connected to a pair of frog legs. The rear legs of the frog are in turn pivotally connected to the body. Thus with the movement of the gas operated valve there will be a kicking movement of the frog legs to simulate the actual swimming effect of a frog. The frog is so constructed that it will sink slowly in water. One of the features of this invention is to utilize a chemical that releases gas when the chemical comes in contact with water. This chemical may be used in the form of pellets. The pellet is inserted within the hollow body of the frog and when the frog is submerged in water, the water flows through perforations in the bottom cover of the frog and the pellet becomes submerged in water. The gas that is released will fill the gas chamber within the body of the frog. This gas will in turn make the frog buoyant and thus the frog will rise to the surface of the water. As the gas continues to be liberated, the valve is pivotally moved to an extreme position where the ball check is opened and the gas allowed to escape. With the escape of this gas, the frog will again slowly sink in the body of water and the whole cycle of operation repeats until the chemical pellet has exhausted its ability to release gas.

It is an object of this invention to provide a lure that is lifelike in its movements when submerged in a body of water.

It is a further object of this invention to provide a fishing lure containing a chemical charge that will dive of its own accord within a body of water and in turn will rise of its own accord and will repeat these movements as long as the charge within the lure is active.

It is a still further object of this invention to provide a fishing lure that simulates a frog in its appearance and in its movements and in which a gas releasing chemical provides the energy to produce the movements of the frog and in addition provides a natural gas bubble release from the mouth of the frog.

A further object of this invention is to provide a marine device that may be charged with a gas releasing chemical and in which a valve mechanism is provided so that the device when deposited in water will sink but with the release of the gas it will again rise and upon the release of the gas from the valve mechanism the device will repeat its cycle of diving and rising.

It is another object of this invention to provide a toy replica of a frog that is not buoyant in water but is provided with means to make the frog buoyant and produce a varying pattern of diving and rising in the water to simulate the realistic effects of a frog while swimming.

Further objects of this invention may be apparent by reference to the accompanying detailed description and the drawings in which Fig. 1 illustrates a side elevational view of the lure partly in cross section, Fig. 2 illustrates a side elevational view of the lure in water in fully buoyant position and shown partly in cross section, and Fig. 3 illustrates a bottom plan view taken on line 3—3 of Fig. 1.

Referring to Fig. 1 there is illustrated a frog body 10. The body 10 is hollow and is provided with a pair of apertures 11 in the nose of the body and an aperture 12 at the top of the body and a large opening 14 in the bottom of the body. The rear end of the frog body extends over the part to which the legs are attached. A pair of frog legs 17 are provided with yoke ends 15 which are in turn provided with apertures 16 to permit pivotally supporting the legs 17. An operating mechanism 20 is inserted through aperture 14 into the hollow body of the frog. The mechanism 20 is affixed to the frog body by means of a flange 21 to thus retain the mechanism in a tight relationship to the hollow body 10. The rear edge of the flange 21 is provided with apertures to permit the yoke ends of the legs to be attached by means of pins 19. The mechanism 30 is comprised of a first or pellet containing chamber 22 and a second or valve chamber 23. Chamber 22 is provided with a small orifice 24 at the top thereof and a hinged cover 25 covering the bottom of said chamber. The cover 25 is supported by a hinge 26 attached to the flange 21. The cover 25 is provided with a plurality of perforations 27. The cover 25 may be provided with a spring 28 to insure the cover remaining in the closed position illustrated. Chamber 23 is provided with a small aperture 30 at the top thereof and a ball valve 31 of a buoyant material is inserted within the chamber 23. Valve 31 is of a diameter slightly greater than the opening 30. Flange 21 is provided with a pair of upright supporting elements 33 and elements 33 are provided with apertures 34. The chamber 23 is provided at one end with arms 35. Each arm 35 at its base is provided with an aperture 36 while at its upper end it is provided with an aperture 37. The chamber 23 is then supported in a pivotal position as illustrated in Figs. 1 and 2 by a pair of pins 38 and 39, the pins passing through the apertures 36 and 34 to retain the structure as illustrated. A pair of wires 40 and 41 (Fig. 3) are provided to connect the aperture 37 of each of the arms 35 with one of the legs 17 of the frog. The legs 17 are provided with a pair of flanges 42 in which apertures 43 are formed so that the ends of the wires 40 and 41 may be looped about a pin 44, the pin 44 in turn being inserted through the aperture 43 to complete the pivotal connection to the legs of the frog. Thus it is apparent that with the pivotal movement of arms 35 there will be a proportional degree of pivotal movement of the legs 17. The degree of movement of the legs 17 is dependent upon the degree of movement of arms 35 to which they are connected. Arms 35 being a part of chamber 23 are necessarily dependent upon the movement of chamber 23. Fig. 1 illustrates the normal empty position of chamber 23. When the frog is inserted in water, the water will enter through chamber 22 as well as around the edges of the body, thus entering into chamber 23 carrying the buoyant valve 31 up and into the opening 30 to seal the chamber 23. Thus the check valve 31 is in position for the further operation or pivotal movement of chamber 23. A chemical pellet 50 (sodium bicarbonate, citric or tartaric acid, metallic calcium or calcium hydride) may be utilized as these chemicals will liberate gas when they come in contact with water. The chemical pellet 50 is inserted in chamber 22 by simply opening the pivotal cover 25 and when the frog is inserted in water the pellet 50 will liberate the gas. The gas will pass through the orifice 24 into chamber 23 and will accumulate about the check ball 31. Since the check ball 31 prevents the escape of the gas, the gas will fill the flotation chamber 23 sufficiently to provide buoyancy and thus allow the frog to rise to the surface as illustrated in Fig. 2. The gas accumulating in the flotation chamber 23 continues to move the chamber on its pivotal hinge until it reaches an extreme position as illustrated in Fig. 2. It is to be noted that as the gas accumulates in chamber 23, the greater area of the ball facing toward the interior of the chamber provides the surface upon which the gas pressure acts to hold the check ball in place as it is moved. An adjustable screw 51 is mounted in the back of the frog so that the point of screw 51 will strike the center of the check ball 31. It is necessary to adjust the screw 51 so that it will displace the check ball 31 after sufficient gas has accumulated in the chamber 23 to produce the desired buoyancy, otherwise the frog would not ascend to the water surface and of course this fact may be taken advantage of in the event that it is not desirable to permit the lure to reach the surface. In such case there will be a slight gyration of a diving and rising effect. When the flotation chamber 23 has reached its extreme position (Fig. 2) screw 51 is the means of displacing check ball 31 thus allowing the gas to escape through the aperture 30 and the gas will in turn pass out through the apertures 11. In order that the frog may be easily attached to a fishing line there is provided an eye bolt 53 affixed to the front lower edge of the frog as illustrated in Figs. 1 and 2. It is to be noted that the frog body must be constructed in such a manner that it will retain its proper position in the water and in order to do this the center of gravity must be located below the center of buoyancy. This may be accomplished by constructing the upper portion of the frog from a substance such as balsa wood or hollow plastic and locating the heavier parts at the bottom of the frog.

Although we have described the lure and its operation as utilized with a fishing line to provide the desired attraction for a fish, the device may be considered as a toy without reference to fishing equipment and in such instance the toy will be free to dive and rise within a body of water as long as the chemical pellet releases energy after which the pellet must be renewed. It is further understood that although we have illustrated a froglike structure the device described as inserted within a frog body might similarly be inserted within other marine bodies such as a toy submarine or the figure of a diver and in each instance a similar gyration of the object will be produced either with an external movement similar to the frog legs or with a simple fall and rise of the object due to the formation of gas and the release of the gas.

Various changes and modifications may be made to this device without departing from the spirit of this invention and this invention shall be limited only by the appended claims.

What is claimed is:

1. A fish lure comprising a hollow froglike body which includes an operating mechanism mounted within said body, said operating mechanism provided with first and second chambers, said first chamber provided to retain a quantity of a chemical which when moistened with water generates a gas, said first chamber provided with an orifice that discharges said gas into said second chamber, said second chamber pivotally supported and formed in the shape of a cone to surround and cover said first chamber, said second chamber provided with an aperture in the apex of the cone, a buoyant check valve in said second chamber, a pin mounted in the back of the frog body to align with the central axis of the aperture of the second chamber when the second chamber is in a predetermined open position, a line attaching means connected to said body, an aperture in said body to allow gas to escape from within said body.

2. A fish lure comprising a froglike body which includes an operating mechanism affixed to said body, said operating mechanism provided with first and second chambers, said first chamber provided to retain a quantity of a chemical which when moistened with water generates a gas, said first chamber provided with an orifice that discharges said gas into said second chamber, said second chamber pivotally supported and formed in the shape of a cone to surround and cover said first chamber, said second chamber provided with an aperture in the apex of the cone, a check valve in said second chamber, an adjustable threadedly secured pin mounted in the back of the frog body to align with the central axis of the aperture of the second chamber when the second chamber is in a predetermined open position, a line attaching means connected to said body, a plurality of apertures in said body to allow gas to escape from within said body.

3. In a device according to claim 2, said apertures formed as nostrils of the body to allow gas to escape from within said body.

4. A fish lure comprising a froglike body which includes a pair of pivotally supported legs and an operating mechanism affixed to said body, said operating mechanism provided with first and second chambers, said first chamber provided to retain a quantity of a chemical which when moistened with water generates a gas, said first chamber provided with an orifice that discharges said gas into said second chamber, a pair of bell crank levers extending from said second chamber and both said levers and chamber pivotally supported, said second chamber provided with an aperture in the apex of the cone, a check valve in said second chamber, an adjustable threadedly secured pin mounted in the back of the frog body to align with the central axis of the aperture of the second chamber when the second chamber is in a predetermined open position, said pair of bell crank levers connected at their upper ends by means of a pair of wires to said frog legs, a line supporting means attached to said body.

5. A fish lure comprising a hollow body, said body including an operating mechanism mounted within said body, said operating mechanism provided with first and second chambers, said first chamber provided to retain a quantity of a chemical which when moistened with water generates a gas, said first chamber provided with an orifice that discharges said gas into said second chamber, said second chamber pivotally supported and formed in the shape of a cone to completely encompass said first chamber, said second chamber provided with an aperture in the apex of the cone, a check valve in said second chamber, a pin mounted in the back of the body to align with the central axis of the aperture of the second chamber when the second chamber is in a predetermined open position, a line attaching means connected to said body.

6. In a device according to claim 5, a pivotally supported perforated cover for said first chamber, said chemical that is used to charge said first chamber formed as a pellet.

7. A fish lure comprising a body simulating a lifelike bait which includes an operating mechanism affixed to said body, said operating mechanism provided with first and second chambers, said first chamber provided to retain a quantity of a chemical which when moistened with water generates a gas, said first chamber provided with an orifice that discharges said gas into said second chamber, said second chamber pivotally supported and formed in the shape of a cone to completely encompass said first chamber, said second chamber provided with an aperture in the apex of the cone, a check valve in said second chamber, an adjustable threadedly secured pin mounted in the back of the body to align with the central axis of the aperture of the second chamber when the second chamber is in a predetermined open position, a line attaching means connected to said body, the upper portion of said body constructed of a balsa wood, the center of gravity of said fish lure being positioned below the center of buoyancy.

8. In a marine device comprising a hollow body which includes a pair of pivotally supported appendages and an operating mechanism affixed to said body, said operating mechanism provided with first and second chambers, said first chamber provided to retain a quantity of a chemical which when moistened with water generates a gas, said first chamber provided with an orifice that discharges said gas into said second chamber, a pair of bell crank levers extending from said second chamber and both said levers and chamber being pivotally supported, said second chamber provided with an aperture in the apex of the cone, a check valve in said second chamber, an adjustable threadedly secured pin mounted in the back of the body to align with the central axis of the aperture of the second chamber when the second chamber is in a predetermined open position, said pair of bell crank levers connected at their upper ends by means of a pair of wires to said appendages, a line supporting means attached to said body.

NICHOLAS N. SOLOVIOFF.

References Cited in the file of this patent

UNITED STATES PATENTS

| Number | Name | Date |
|---|---|---|
| 670,727 | Poli | Mar. 26, 1901 |
| 1,007,011 | Sekikawa | Oct. 24, 1911 |
| 1,361,561 | Yancey | Dec. 7, 1920 |
| 1,776,791 | Herbst | Sept. 30, 1930 |
| 2,168,767 | Ellsworth | Aug. 8, 1939 |